US006970835B1

(12) United States Patent
Forward

(10) Patent No.: US 6,970,835 B1
(45) Date of Patent: *Nov. 29, 2005

(54) SYSTEM AND METHOD FOR DIRECTING AND INSTRUCTING CUSTOMERS TO DEAL WITH SPECIFIC MERCHANTS USING INCENTIVES

(75) Inventor: David R. Forward, Potomac, MD (US)

(73) Assignee: Internest, Inc., Bloomingdale, IL (US)

( * ) Notice: Subject to any disclaimer, the term of this patent is extended or adjusted under 35 U.S.C. 154(b) by 93 days.

This patent is subject to a terminal disclaimer.

(21) Appl. No.: 10/446,053

(22) Filed: May 28, 2003

Related U.S. Application Data

(63) Continuation of application No. 09/383,196, filed on Aug. 26, 1999, now Pat. No. 6,578,011.

(51) Int. Cl.[7] .............................................. G06F 17/60

(52) U.S. Cl. ........................... 705/14; 705/10; 705/26; 705/27

(58) Field of Search ............................... 705/1, 10, 14, 705/26, 27

(56) References Cited

U.S. PATENT DOCUMENTS

| | | | |
|---|---|---|---|
| 4,870,576 A | 9/1989 | Tornetta | 705/1 |
| 5,032,989 A | 7/1991 | Tornetta | 705/1 |
| 5,233,514 A | 8/1993 | Ayyoubi et al. | 705/14 |
| 5,283,731 A | 2/1994 | Lalonde et al. | 705/1 |
| 5,297,026 A | 3/1994 | Hoffman | 705/14 |
| 5,483,444 A | 1/1996 | Heintzeman et al. | 705/5 |
| 5,537,314 A | 7/1996 | Kanter | 705/14 |
| 5,664,115 A | 9/1997 | Fraser | 705/37 |
| 5,710,886 A | 1/1998 | Christensen et al. | 705/14 |
| 5,729,693 A | 3/1998 | Holda-Fleck | 705/14 |
| 5,754,850 A | 5/1998 | Janssen | 707/104.01 |
| 5,774,870 A | 6/1998 | Storey | 705/14 |
| 5,794,207 A | 8/1998 | Walker et al. | 705/27 |
| RE36,116 E | 2/1999 | McCarthy | 705/16 |
| 6,029,141 A | 2/2000 | Bezos et al. | 705/27 |
| 6,405,174 B1 | 6/2002 | Walker et al. | 705/14 |

FOREIGN PATENT DOCUMENTS

EP 370847 A1 5/1990

OTHER PUBLICATIONS

Dialog reference. File 583 # 03420088 Newcastle BS Revamps Estate agency ARMS, Money Week, Apr. 18, 1990, p. 2.*

(Continued)

*Primary Examiner*—Raquel Alvarez
(74) *Attorney, Agent, or Firm*—Needle & Rosenberg, P.C.

(57) ABSTRACT

A buyer-seller matching system that uses incentives to verify commissions from matching the buyer with a seller. An item locator system that comprises a repository of information about items for purchase may be provided over a network for users to access information about items for purchase. Along with each item, the system presents an incentive that may be realized if that item is purchased from a designated third party seller. The user then executes the purchase with the seller, who pays the system the agreed upon fee and also issues a certification of purchase to the buyer. The user may then take the certification of purchase back to the central repository to redeem the incentive. The item locator system then checks to verify that it has received a fee or commission from the seller for bringing the seller a buyer of the item. The fee or commission may be based on the price of the item, such as if the item is a new house for sale and the seller is a new house builder.

13 Claims, 4 Drawing Sheets

200

OTHER PUBLICATIONS

Homeseekers.com, printed on Oct. 13, 1999, 4 pages.
Homebuilder.com, printed on Oct. 13, 1999, 16 pages.
Owners.com, printed on Oct. 13, 1999, 1 page.
Iown.com, printed on Oct. 13, 1999, 5 pages.
Homeadvisor.msn.com, printed on Oct. 13, 1999, 5 pages.
Realtor.com, printed on Oct. 13, 1999, 7 pages.
Owners.com, printed on Oct. 13, 1999, 1 page.

* cited by examiner

SYSTEM AND METHOD FOR DIRECTING AND INSTRUCTING CUSTOMERS TO DEAL WITH SPECIFIC MERCHANTS USING INCENTIVES

RELATED APPLICATIONS

This application is a Continuation of U.S. patent application Ser. No. 09/383,196 filed Aug. 26, 1999, now U.S. Pat. No. 6,578,011 entitled "SYSTEM AND METHOD FOR DIRECTING AND INSTRUCTING CUSTOMERS TO DEAL WITH SPECIFIC MERCHANTS USING INCENTIVES," the contents of which are incorporated herein by reference in their entirety.

FIELD OF INVENTION

The present invention relates generally to an Internet e-commerce business method of promoting products to prospective customers, and instructing and enticing those prospective customers to deal with specific merchants by offering the customers a valuable incentive that is redeemable when the customer purchases from the specific merchant, with the merchant then providing a fee or commission to the Internet company that directed the customer to that merchant.

BACKGROUND OF THE INVENTION

When making purchases for items, such as, for example, houses, boats, or cars, customers often enlist the aid of a broker or intermediary to assist them in locating items for purchase. Brokers may provide information about the product to be bought as well as information about merchants (or "sellers") selling the product. Information may include the quality of the product and the merchants, other prices, and the like. This information allows a customer (or "buyer") to make an informed decision with regard to which products to purchase and at what price. For some types of items, such as real estate, sellers of the items typically pay a commission to the brokers involved in the transaction. When the buyer uses a broker's agent, commonly called a co-broker, the commission is divided between the co-broker and the seller's broker. For example, in many situations, the total commission paid on the sale of a house is six percent. In that situation, the seller's broker and the co-broker each will typically receive three percent of the purchase price of the house as a commission.

This same situation may also apply with the sale of new houses, where the new house is being sold directly by the builder of the house. The new house builder retains a broker to act as his agent and if the volume of houses is significant, the new house builder may be able to negotiate a reduced percentage arrangement with that broker. The new house builder, however, usually must pay a full 3% to any co-broker that brings him a buyer because the co-broker will not bring him buyers if he is not going to receive the "normal" commission. With such a system, the new house builder must pay up to six percent of the sale price of the house which represents a significant cost for the new house builder.

Several World Wide Web sites have been developed to assist the new house builder in identifying potential purchasers. For example, many new house builders have a web site of their own dedicated to houses that they build. Some of these sites may even provide a directory of neighborhoods that the particular builder is developing.

Other web sites provide a listing of homes by region with a number of different builders being listed. This provides the advantage of providing a single location that a house buyer may visit in order to look for a house to purchase. While these sites may seem advantageous to house buyers, they are costly to the house builders. These sites typically charge a fee for the house builders to be included in the directory. This cost represents an additional cost to the house builder that is undesirable.

These and other drawbacks exist with existing systems.

SUMMARY OF THE INVENTION

An object of the present invention is to overcome these and other drawbacks in existing systems and methods.

Another object of the invention is to provide a mutually beneficial environment for bringing together buyers and sellers for the purchase of items that typically involve a commission for a third party paid by either the buyer or the seller of the item.

Another object of the present invention is to provide a central system that promotes an item-for-sale over a network to potential purchasers with an incentive to those potential purchasers to purchase the item. That incentive, or reward, is provided by the operator of the central system only after the purchase is made, and only after the purchaser has notified the operator of the central system that he has made the purchase.

Another object of the invention is to provide a new business method for eliminating agent's commissions in the sale of items through the use of a central system for bringing together buyers and sellers of items.

Another object of the present invention is to provide a business method that provides financial incentives for sellers to participate in a central directory system by offering to provide their content in exchange for a fee paid based on sales generated. These and other objects of the invention are accomplished according to various embodiments of the invention. The present invention provides an item locator system that comprises a repository of information about items for purchase. Users may connect to the item locator system to identify an item for purchase and the identity of the seller of the item. Along with each item, the user may be presented with an incentive to execute the purchase. The user then executes the purchase with the seller, and receives a proof of purchase. The user may then advise the system operator of his purchase and the operator of the central system then provides the purchaser with the valuable reward promised.

As part of this method, the item locator system may have an agreement with item sellers whose items are being displayed. The item locator system agrees to provide information about the item provider and his products, to its users in exchange for a fee based on the actual sale of the item. The fee may be set as a percentage of the sale price of the item, may be a flat fee or may be some other type of fee arrangement.

In one embodiment, the present invention may comprise a method relating to sale of new houses through a web-site accessible by potential buyers over the Internet. The potential buyers utilize a web browser system to connect to a server providing a web site displaying new houses. The web site may enable the user to search for and locate a new house to be purchased. The web-site further provides an incentive (or reward) to encourage the user to purchase the new house. The potential buyer then takes the information provided by the web-site and visits the new house seller. If a purchase is completed between the buyer and the seller, then the buyer returns to the web-site to collect the promised reward. The reward is provided upon verification that a purchase took place between the buyer and the seller. The operator of the central system may be paid a commission or fee that may be received at the closing or settlement of the sale from the seller to the buyer. The operator of the central system web-site provides the promised reward to the purchaser or issues a certification that entitles the buyer to the incentive through another entity, as a method of checking that the seller has paid the agreed fee to the operator of the central system.

In one embodiment, as part of the incentive, the buyer agrees to forego use of a co-broker that otherwise would be entitled to a commission. The fee or commission paid by the seller to the operator of the central system may be less than a fee to which a co-broker would ordinarily be entitled. Further, the web-site may forego up-front payment from the seller for promoting his homes for sale and presenting the builder's information because they receive the agreed fee only when and if a sale occurs.

A method and system according to the present invention provides advantages and economic incentives for all involved through the elimination of the co-broker's fee. Specifically, the house seller benefits from avoiding a 3% co-broker's fee and receives advertising in a widely distributed environment without any up front cost. Therefore, house sellers are provided an incentive to participate in this system to reduce their overall sales and marketing costs and to be introduced to motivated buyers.

Purchasers are provided an incentive to use the system because of the value of the incentive and the convenience in locating new houses. The incentive may be significant depending on the type of house being purchased. For example, the incentive may be a percentage rebate on the house of one or more percentage points for larger purchases.

Finally, the web-site operator benefits by making a fee paid to him by the seller. Due to the price of new houses, even a small percentage commission could yield significant revenues that would overshadow the incentive costs and costs of operating the web-site.

Accordingly, this new business method and system for employing this business method utilize web-based technology to bring together buyers and sellers for their mutual benefit. Other objects and advantages exist for the present invention.

DETAILED DESCRIPTION OF THE PREFERRED EMBODIMENTS

For purposes of illustration, a system and method according to an embodiment of the present invention are described below. That system is described as being part of an Internet based system that enables buyers to contact a web-site that contains new house information. It should be understood that the invention is not limited to an Internet system or to provision of new house information. The characteristics and parameters pertaining to a web-site for selling new homes are equally applicable to other types of sales, such as for selling cars, yachts, boats or other products. Further, the present invention could be implemented without use of a different networked environment, such as a cable television network, a telephone network, a satellite connection network, or any other system that provides information to a user. In particular, the present invention is particularly useful for sale of items for which an agent for the buyer and/or seller may receive a commission. Through use of the present invention, a commissioned co-broker may not be used to the benefit of both the buyer and seller.

Figure 1:
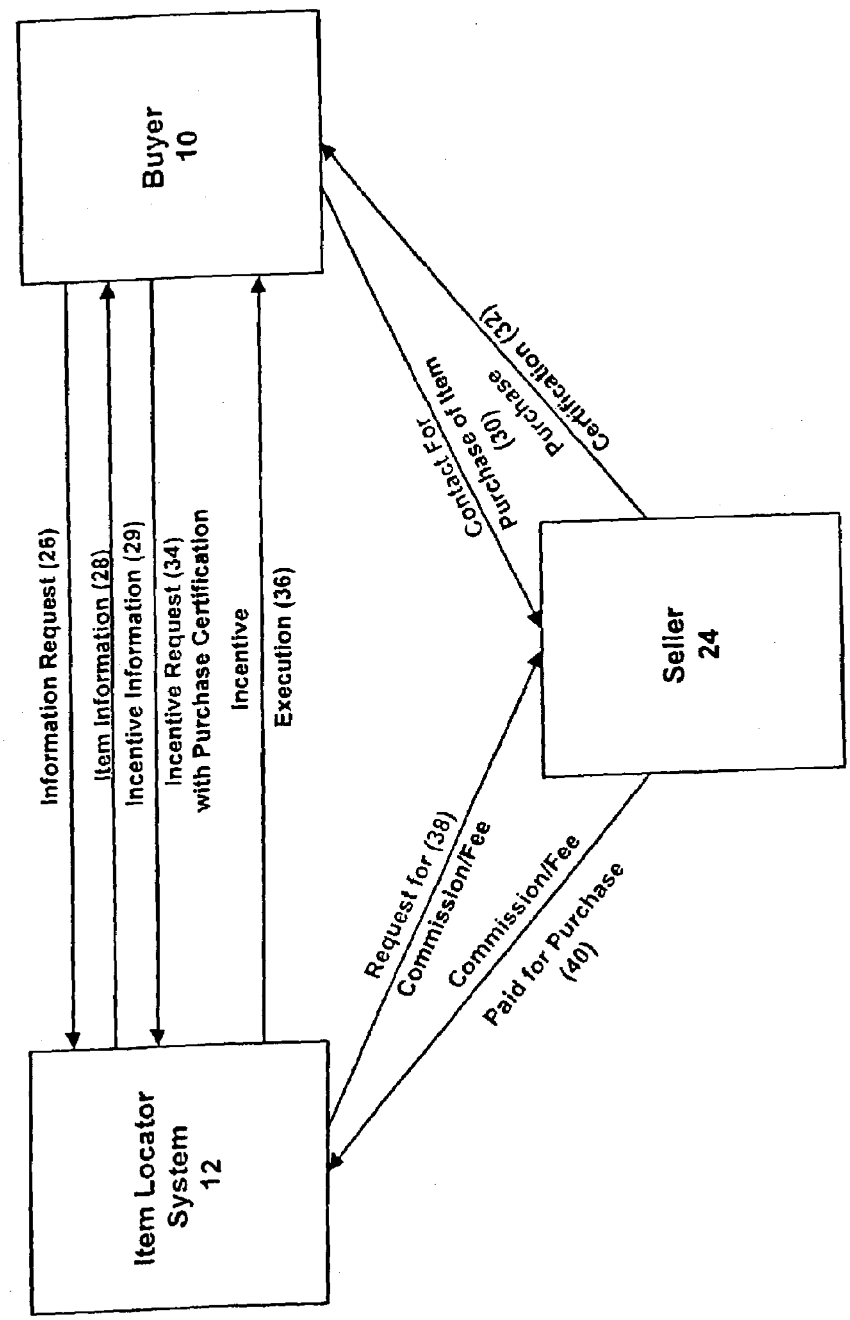
FIG. 1 is a diagram illustrating the flow of information in a method according to an embodiment of the present invention.
Figure 2:
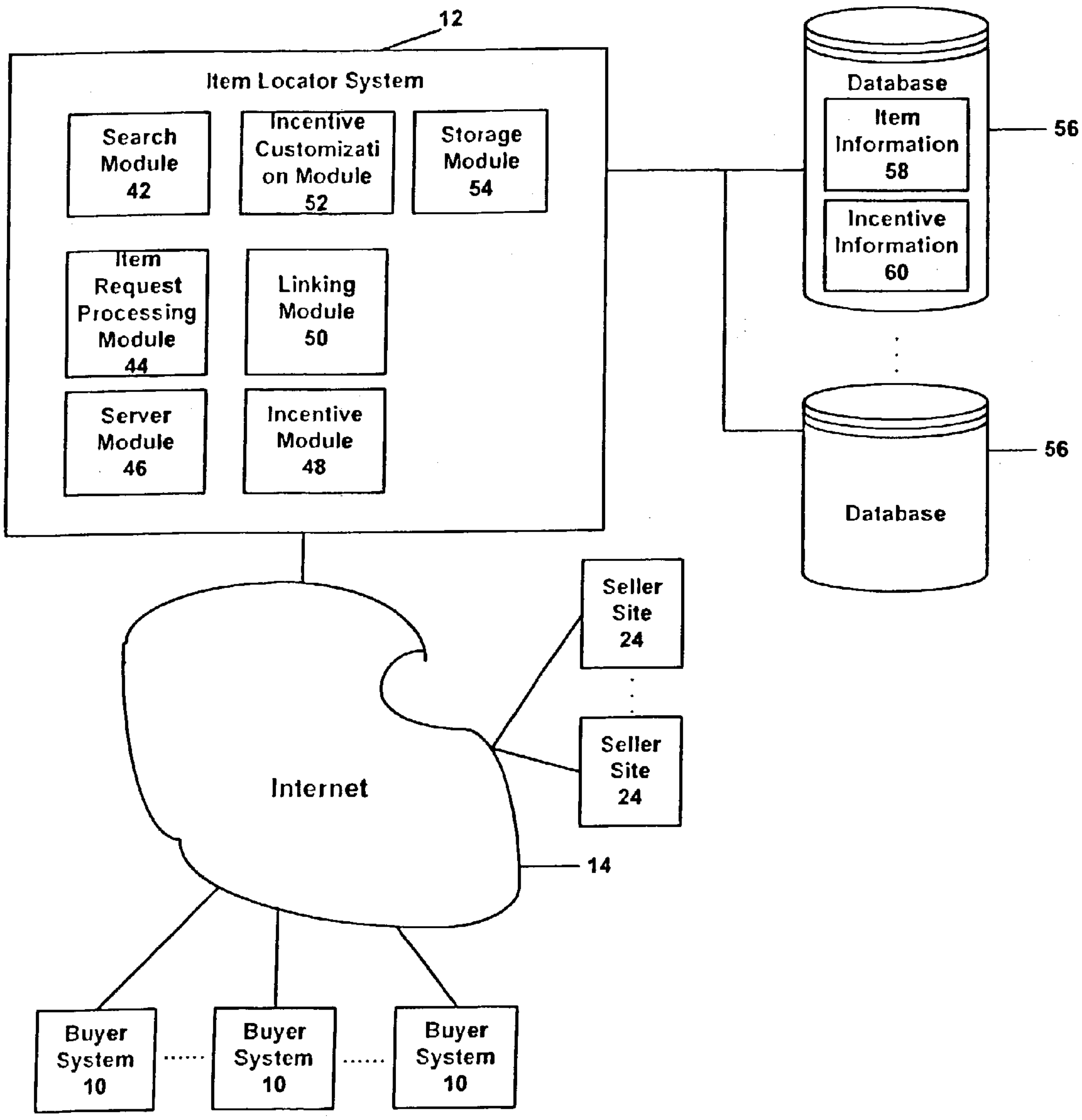
FIG. 2 depicts a schematic diagram of a system according to an embodiment of the present invention.
Figure 3:
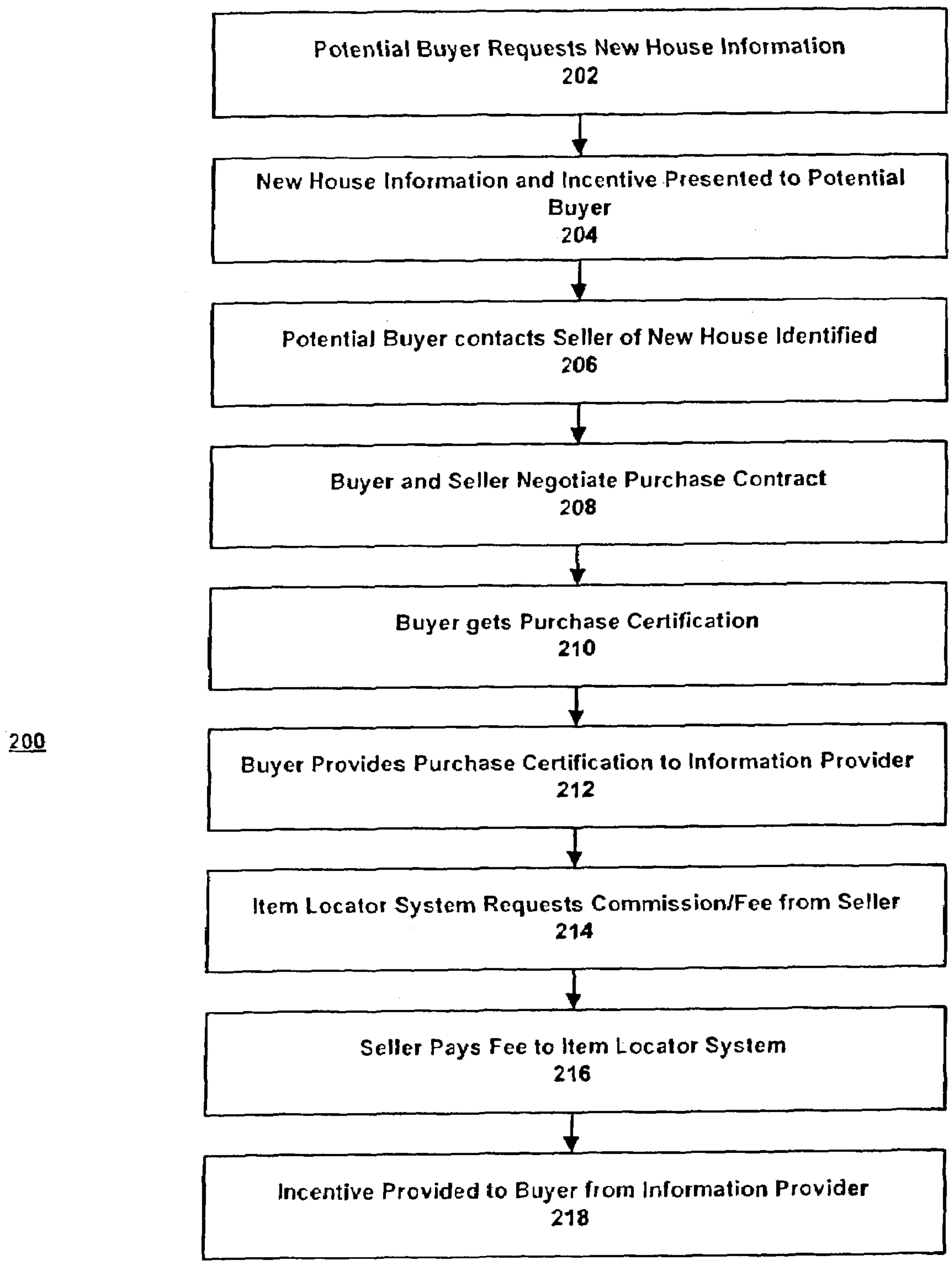
FIG. 3 depicts a flow diagram of a method according to an embodiment of the present invention.

According to an embodiment of the present invention, FIG. 1 depicts a schematic depiction of the flow of information in a method of connecting buyers and sellers of information without use of a commissioned agent. This schematic may also be understood with reference to FIG. 3 which depicts a flow diagram of a method 200 according to the present invention. Method 200 may be performed through the use of a system, as depicted in FIG. 2, for example, as described in detail below.

In step 202 of method 200, a buyer 10 transmits an information request 26 to the item locator system 12. The item locator system 12 may comprise a server system connected over the world wide web or Internet to provide web-pages upon request from one or more users utilizing a web browser. Accordingly, step 200 may comprise buyer 10 using a browser to connect over the Internet to a web-site that provides new house information, for example. Use of existing browser/server technology may be used to transmit the request to the item locator system 12.

Figure 4:
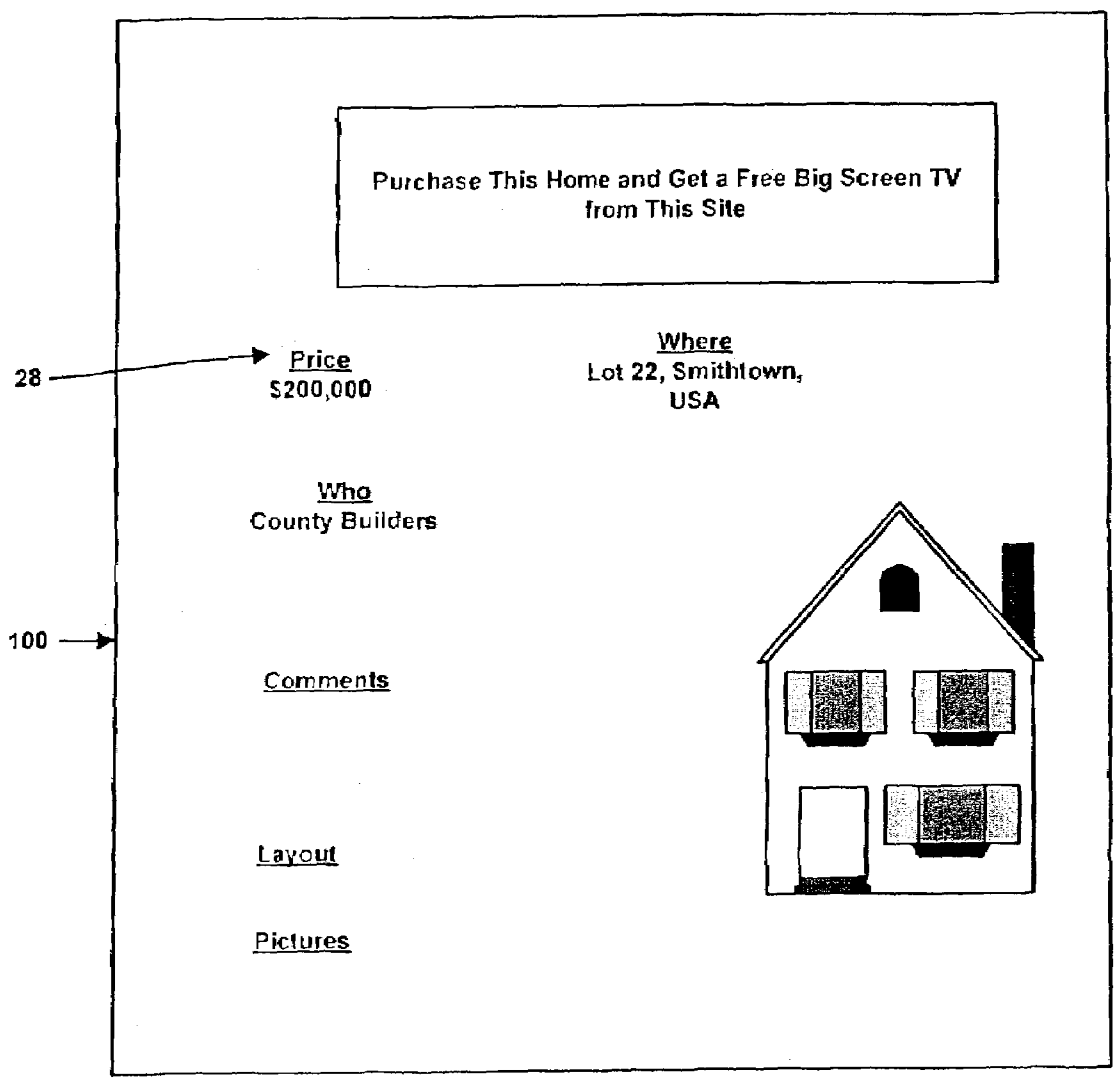
FIG. 4 depicts a screen shot of a screen presented by a system according to an embodiment of the present invention.

In response to the potential buyer's request for information from the item locator system 12 in step 204, the item locator system 12 provides item information 28 and incentive information 29. FIG. 4 depicts an embodiment of a page 100 of information presented by item locator system 12, such as a web-page presented over the Internet to the user to be viewed using a web browser. As depicted in FIG. 4, the information may comprise item information 28 and incentive information 29.

The item information 28 may comprise new house information related to a request transmitted in step 202. In the example of new houses, the item information may comprise a vast amount of information for the user to review in selecting a potential new house. For example, the item-related information may include all of the information typically included in a multiple listing and additionally include pictures of the new house, layouts of the house, floor plans, the address, maps, options for the interior, summary of the builder's history, chat related to the builder, a section for comments from previous purchasers from that builder, pricing information, availability information, pictures of the neighborhood, listings of community activities, directions to nearby restaurants and places of interest, a virtual tour of model homes, location of school, school district rating information, location of churches, refuse information, community association fees, etc.

Specifically, the item information may also include contact information for the seller. In the case of a new house builder, the information may include the name of the builder, the builder's address, a telephone number, an electronic-mail address, a link to the web-site for the builder, directions to the builder's offices, directions to the location and any other information that may be used to contact the builder.

Other seller-specific information may also be provided, including the number of years in business, any licenses obtained, certifications obtained, or honors bestowed.

The item information may be organized into a plurality of different pages, with links between the pages. Additionally, the pages may contain links to other web-sites to advertisements, promotions, or information. The advertisements, promotions, information, real estate news, information about moving, Frequently Asked Questions may be customized based on a user profile, location of the house being displayed, price range, etc. For example, the pages may contain links to mortgage calculator sites to enable the user to determine how much a mortgage payment would be based on a specific purchase price.

Steps 202 and 204 may be iteratively performed with the buyer refining, modifying, expanding, or issuing new searches until an item of interest is identified. For example, the item locator system 12 may enable the user to search for new houses by region, by sub-division, by builder, by construction date, or by any number of different search criteria, number of bedrooms, number of bathrooms, total rooms, square feet, cars in garage, square feet of lot, etc. By way of example only, according to an embodiment of the invention, a buyer may need information about a number of different sellers at a number of different times, and may need information about various locations for new houses from one or more sellers at a number of different times, thereby requiring the buyer to request information at a number of different times. Information provider 12 may provide the requested information at appropriate times to buyer 10.

Along with the item-related information 28, the web-site may also provide incentive information 29 to the buyer. The incentive information may include an indication of an incentive that will be provided through the item locator system if the buyer purchases the item from the item-related information 28. That incentive may comprise any thing of value that would encourage a purchaser to purchase the item of interest. For example, the incentive may comprise a rebate or a reward such as an offer for a free or reduced cost appliance, a cash offer, points towards closing, moving expenses, cleaning services, landscaping, pool installation, finished basement, alarm system, several months mortgage payment, vacation trip, etc. Incentive information 29 may also include the incentives options offered (e.g., choices of products awards, cash awards, etc.), buyer requirements to receive the incentive, and what an incentive may be worth. For example, the incentive information may specify that the buyer may not use a co-broker in order to be eligible to receive the incentive or may only use a specific buyer's agent with whom the item locator system has a fee sharing arrangement. Other incentive information may also be included.

Upon locating the item information 28 desired and corresponding incentive information 29, in step 206, the potential buyer contacts the seller using the information provided in the item information 28. That contact may be via telephone, electronic mail, person-to-person or any other method of communication. In the new house example, the buyer typically visits the potential new house site and meets with the new house builder or his agent, although other scenarios are also contemplated by the present invention.

In step 208, buyer 10 and a specified seller 24 create a contract 30 for the purchase of the item. That contract 30 may be negotiated in any manner desired. The contract may be formed over a network communication, for example, using digital signatures or other means of authentication. In one embodiment of the present invention, the contract 30 may be formed without the use of a co-broker in order to qualify for the incentive. Also, item locator system 12 may provide a buyer's agent paid out of the revenues generated by the fee or commission received.

As part of that contract 30, buyer 10 receives a purchase certification 32 in step 210. That purchase certification 32 may comprise a copy of the contract, an identification number, a signature, or any other method of certifying that the buyer and seller formed a contract for the purchase of an item at issue. The purchase certification 32 may comprise an electronic certification or a hard copy that is provided. Verification may comprise standard documentation, such as sales contracts, or may comprise the seller issuing a redemption certificate to buyer.

In step 212, the buyer transmits an incentive execution request 34 along with the purchase certification 32 received from the seller to the item locator system 12. That transmission may be electronic or through any other method of delivery. Upon receipt of the request for an incentive and the purchaser certification, the item locator system 12 will verify that the commission or fee has been received from the seller according to a predetermined arrangement. For example, the item locator system 12 and seller 24 may negotiate an arrangement for providing the seller's information on the item locator system for a set fee or for a commission based on the price of the item sold. The fee/commission arrangement may be a percentage of the price of the house, in the new house example, may comprise a flat fee (e.g., $5,000), may comprise a lock-step fee structure, may comprise a point system, with the value of points increasing with the number of sales (e.g., $2,000 per house if 1–5 houses sold per year, $2,200 per house if 6–10 houses sold per year), may comprise a bonus system whereby the seller pays a flat rate with bonuses for volume, or any other compensation system that can be negotiated between these two entities. In another example, large volume house sellers may be given further benefits for participating, including a reduce fee or waiver of the fee every predetermined number of houses sold, such as every fifth house.

Therefore, in step 214, the item locator system 12 transmits a request 38 for the fee or commission from the seller identified in the purchase certification. In step 216, the seller transmits a commission/fee 40 to the item locator system as agreed. These transmissions may be electronic or manual. The proceeding needs to be redone slightly because our plan envisions us being paid at closing by the builder just like the co-broker is now paid at closing. When the buyer requests his entitlement from us we should be able to check to see if the seller has already paid us. It is only if we have not been paid already that we would contact the builder to ask for payment.

Then, in step 218, the item locator system 12 may provide the incentive execution 36 to the buyer. The incentive execution may comprise an electronic certificate, identification number, check, coupon, or any other device that the buyer may use to execute the incentive indirectly with a third party. Alternatively, in step 218, the item locator system 12 may actually deliver the incentive directly. For example, if the incentive is cash, then the item locator system 12 may transmit electronic payment of the cash directly to the buyer. Also, step 218 may be performed prior to or during the performance of steps 214 and 216.

According to another embodiment of the present invention, the item locator system 12 may negotiate arrangements with incentive providers. These incentive providers may recognize the advertising value of being offered as an incentive on a widely accessed web-site. In exchange for the advertising exposure, the incentive providers may provide reduced or free incentives that the item locator system 12 may then offer. For example, the web-site may offer an incentive of a free mortgage point towards closing costs if the purchaser buys a house identified through the web-site. A particular mortgage company may desire to be listed on the new house web-site to attract customers. Therefore, the incentive may specify that the free point is provided if that particular mortgage company issues the loan. For the exposure on the site, the mortgage company may thus provide financial incentives to the web-site to be listed as an incentive provider, such as offering the point at a reduced rate to the item provider system.

Additionally, the incentives may be customized to better entice purchasers to purchase. For example, the incentive may be customized based on personal profile information about the potential purchaser (e.g., age, gender, income level, credit rating, location), demographic information about the items being offered (e.g., price range, location, climate, customs), characteristics about the builder (e.g., different incentives for different builders) or any other method of customization. For example, the incentive for a house in the $200,000 range may be different than houses in the $100,000 range. In Florida, the incentive may comprise a swimming pool, whereas in Minnesota, the incentive may comprise a hot tub. Also, one builder may have an affiliation with a particular lender and therefore, the incentive for houses for that lender may relate to deals for better mortgage rates with that lender, whereas another builder may have an affiliation with a landscaping company, so the incentive may relate to provision of landscaping services. Therefore, the builder whose information is posted may have some say in the incentive provided as well. In this arrangement, the builder may also make financial arrangements with the incentive provider for sharing of revenues out of the sale of the new house.

An embodiment of a system for implementing this method is depicted in FIG. 2. FIG. 2 depicts only one embodiment and it should be understood that other embodiments for carrying out the present invention may also be provided. A plurality of buyers 10 may be connected using networking technology to an item locator system 12. In this embodiment, the buyers 10 may connect to item locator system 12 over the Internet 14, although network 14 may comprise a cable network, a LAN, a WAN, an intranet, the Supernet, or any other network that allows transmission of information.

Item locator system 12 may comprise a plurality of modules that function to perform the functions described above in addition to other functions set forth below. Although separate modules are described for performing these functions, it should be understood that additional modules may also be provided and that modules may be combined.

According to an embodiment of the invention, item locator system 12 may comprise a search module 42, an item request processing module 44, a server module 46, an incentive module 48, a linking module 50, an incentive customization module 52 and a storage module 54.

Search module 42 may cooperate with one or more databases 56 in communication with item locator system 12 to retrieve item information based on user defined requests. Many technologies for searching web-based information exist and such technologies may be utilized. Other search technologies may also be used. Databases 56 may store both item information and incentive information in item information data structure 58 and incentive data structure 60. These data structures may be combined into a single data structure as well, as desired or may be distributed over a network, including the internet.

Search module 42 cooperates with an item request processing module 44 to receive user requests and generate output. Output from search module 42 may be provided to buyers 10 over network 14 using server module 46. Server module 46 may comprise any server technology, and particular may comprise a web-based server.

Incentive module 48 may comprise a module for selecting and presenting incentives along with item information generated by search module 42. Incentive module 48 cooperates with database 56 to retrieve information from the incentive data structure 60. Also, an incentive customization module 52 may be provided to customize the incentive provided based on selected criteria. Customization module 52 may access one or more other databases to select the appropriate incentive based on data as compared with the established criteria.

Additionally, a linking module 50 may be provided for linking advertisements, graphics or other information to be displayed associated with the incentive that may be located at other sites. Additionally, linking module 50 may enable linking to seller sites 24 that offer items for sale on the item locator system 12. According to an embodiment of the invention, each seller may have its own website 24 accessible over the internet by item locator system 12.

A storage module 54 may store various information about buyers, certificates issued, seller information and other data. Also, buyers may register with the item locator system to receive updates of new homes added to the site or other purposes.

According to one specific embodiment of the present invention, the modules of item locator system 12 may comprise computer software components. Other arrangements may also be provided.

Other embodiments, uses, and advantages of the present invention will be apparent to those skilled in the art from consideration of the specification and practice of the invention disclosed herein. The specification and example should be considered exemplary only. The intended scope of the invention is only limited by the claims appended hereto.

What is claimed is:

1. A method for using a networked system to promote items from one or more sellers, wherein operation by the networked system comprises the steps of:

presenting information to a potential buyer of an item at a host site visited by potential buyers, the information comprising item information and incentive information, wherein the item information comprises information about an identified seller of the promoted item and the incentive information comprises information about an incentive offered by the host site to the potential buyer if that potential buyer purchased the promoted item in the item information from the identified seller in the item information, wherein the amount and type of the incentive is dependent upon the promoted item and the identified seller in the item information, and wherein the incentive information specifies a condition that the buyer is only qualified for the incentive if the buyer uses a buyer's agent with whom the host site has a fee sharing arrangement;

receiving a request for the incentive at the host site from the buyer when the buyer purchases the promoted item from the identified seller;

requesting certification from the buyer that the buyer purchased the promoted item from the identified seller;

receiving certification from a buyer at the host site indicating that the buyer purchased the promoted item from the identified seller and that the buyer used the buyer's agent with whom the host site has a fee sharing arrangement entitling that buyer to the incentive, wherein the certification is issued to the buyer by the seller upon purchase of the promoted item and thereby confirming that the seller reports the sale to the networked system operator;

determining the amount and type of the incentive due to the buyer;

presenting the incentive to the buyer directly from the host site;

requesting payment from the seller to the host site as a fee for the host site directing the buyer to the seller; and receiving payment from the seller at the host site when the buyer completes the purchase of the promoted item in the item information from the seller.

2. The method according to claim 1, further comprising the step of receiving a prearranged fee from the identified seller at the host site.

3. The method according to claim 1, wherein the incentive comprises a financial award.

4. The method according to claim 1, wherein the incentive presented is customized based on predetermined criteria.

5. The method according to claim 1, wherein the incentive is to be provided by an incentive provider and wherein the networked system receives a discount on the incentive for providing the incentive with the item for sale.

6. The method according to claim 1, wherein the item for sale is a house.

7. A method for identifying and purchasing a promoted item for sale from one or more sellers based on an incentive presented by a host site, the method comprising the steps of:

accessing information from a host site, the information comprising item information and incentive information, wherein the item information comprises information about an identified seller of the promoted item and the incentive information comprises information about an incentive offered by the host site to the potential buyer if that potential buyer purchased the promoted item in the item information from the identified seller in the item information without use of a broker, wherein the amount and type of the incentive is dependent upon the promoted item and the identified seller in the item information, and wherein the incentive information specifies a condition that the buyer is only qualified for the incentive if the buyer uses a buyer's agent with whom the host site has a fee sharing arrangement;

completing the purchase of the item from the identified seller using a buyer's agent with whom the host site has a fee sharing arrangement and receiving a certification of purchase from the seller;

transmitting the purchase certification to the host site and evidence that the buyer used the buyer's agent with whom the host site has a fee sharing arrangement to receive the incentive; and receiving the incentive directly from the host site after the host site receives compensation from the seller.

8. The method according to claim 7, wherein the incentive comprises a financial award.

9. The method according to claim 7, wherein the incentive presented is customized based on predetermined criteria.

10. The method according to claim 7, wherein the incentive is provided by an incentive provider and wherein the networked system receives a discount on the incentive for providing the incentive with the item for sale.

11. The method according to claim 7, wherein the networked system receives a prearranged fee from the identified seller.

12. The method according to claim 11, wherein the item for sale is a new house and the incentive information specifies that a buyer must use a buyer's agent with whom the host site has a fee sharing arrangement.

13. The method according to claim 7, wherein the item for sale is a house.

* * * * *